US007347119B2

(12) United States Patent
Sasano

(10) Patent No.: US 7,347,119 B2
(45) Date of Patent: Mar. 25, 2008

(54) TURNING MACHINE

(75) Inventor: Masaya Sasano, Chiba (JP)

(73) Assignee: Kabushiki Kaisha MIC, Tokyo (JP)

( * ) Notice: Subject to any disclaimer, the term of this patent is extended or adjusted under 35 U.S.C. 154(b) by 760 days.

(21) Appl. No.: 10/508,188

(22) PCT Filed: Aug. 5, 2002

(86) PCT No.: PCT/JP02/07975

§ 371 (c)(1),
(2), (4) Date: Sep. 17, 2004

(87) PCT Pub. No.: WO03/082423

PCT Pub. Date: Oct. 9, 2003

(65) Prior Publication Data

US 2005/0160853 A1 Jul. 28, 2005

(30) Foreign Application Priority Data

Apr. 2, 2002 (JP) ............................ 2002-100502

(51) Int. Cl.
*H02K 7/116* (2006.01)

(52) U.S. Cl. ...................................... 74/421 A; 472/10

(58) Field of Classification Search .............. 472/6-12; 74/421 A, 421 R, 413, 414, 412 R; 40/427, 40/430, 473, 466

See application file for complete search history.

(56) References Cited

U.S. PATENT DOCUMENTS 1,514,602 A * 11/1924 Charland ..................... 472/10
1,980,391 A * 11/1934 Eslinger ........................ 472/9
3,705,720 A * 12/1972 Nicholls ........................ 472/9
4,925,182 A * 5/1990 Hou .............................. 472/6
5,029,047 A * 7/1991 Kachel ....................... 362/551
5,387,146 A * 2/1995 Smith et al. ................ 446/175

FOREIGN PATENT DOCUMENTS

| | | |
|---|---|---|
| JP | 1974-50100 | 8/1974 |
| JP | 1989-138495 | 9/1989 |
| JP | 2001-113425 | 4/2001 |
| JP | 2001-163442 | 6/2001 |
| JP | 2001-277065 | 10/2001 |
| JP | 2001-277176 | 10/2001 |

* cited by examiner

*Primary Examiner*—Richard Ridley
*Assistant Examiner*—James Pilkington
(74) *Attorney, Agent, or Firm*—Luce, Forward, Hamilton & Scripps LLP; Mitchell Brook

(57) ABSTRACT

To provide a turning device that involves a small number of components, is inexpensive, and can be easily operated.

A turning device (1) is composed of a base plate (2) and a rotating case (10) rotatably provided on the base plate (2). A sun gear (3) is secured to the base plate (2). The rotating case (10) is provided with a planetary gear (33) in mesh with the sun gear (3), a drive motor (20) for rotating the planetary gear (33), a power source portion (49) for supplying electricity to the drive motor (20), a switch (42) for controlling the driving/stopping of the drive motor (20), an operating means (44) for operating the switch (42), and suspending members (52, 53) for suspending a turning body (50), the suspending member (52) being connected to the operating means (44).

1 Claim, 3 Drawing Sheets

TURNING MACHINE

TECHNICAL FIELD

The present invention relates to a turning device, in which a turning body is suspended by a suspending member, and is then turned.

BACKGROUND ART

As disclosed in Japanese Utility Model Publication No. 58-6475, a conventional turning device is composed of a base plate, a rotating member rotatably provided on the base plate, and a control portion. Provided on the base plate are a drive motor for rotating the rotating member, and a power source portion for supplying electricity to the drive motor. The control portion is spaced apart from the base plate, and has a switch, which is connected to the drive motor through a wire. A plurality of string members are suspended from the rotating member, and a turning body is attached to the forward ends of the string members. The turning body is not restricted to a flying object; it may also be a doll-like object.

In this conventional turning device, the base plate is mounted to a height, such as a ceiling; when the switch of the control portion is turned on, the drive motor is driven and the rotating member starts to rotate, circling the turning body suspended from the rotating member by the string members; when the switch of the control portion is turned off, the drive motor is stopped and the rotation of the rotating member is stopped.

In the above-described conventional turning device, it is necessary to provide a control portion having a switch separately from the base plate, and the mounting of the control portion, etc. Is a bother; further, since the number of components is large, the device is rather expensive. Further, providing the control portion directly on the base plate, which is mounted to a height such as a ceiling, leads to difficulty in operation.

The present invention has been made in view of the above-mentioned problems in the prior art. It is an object of the present invention to provide a turning device which includes a rotating case equipped with a switch and an operating means for operating the switch and in which a suspending member for suspending a turning body is connected to the operating means, whereby there is no need to separately provide a control portion having a switch, and no bothersome operation such as the mounting of the control portion is involved; since the number of components of the control portion is small, the device is inexpensive; and further, due to the suspending member, the operation is facilitated.

DISCLOSURE OF THE INVENTION

To achieve the above-mentioned object, the present invention as claimed in claim 1 has the following structure. That is, the present invention relates to a turning device including a base plate and a rotating case rotatably provided on the base plate, the turning device being characterized in that a sun gear is secured to the base plate; the rotating case is provided with a planetary gear in mesh with the sun gear secured to the base plate, a drive motor for rotating the planetary gear, a power source portion for supplying electricity to the drive motor, a switch for controlling the driving/stopping of the drive motor, an operating means for operating the switch, and a suspending member for suspending a turning body; and the suspending member is connected to the operating means.

BEST MODE FOR CARRYING OUT THE INVENTION

Figure 1:
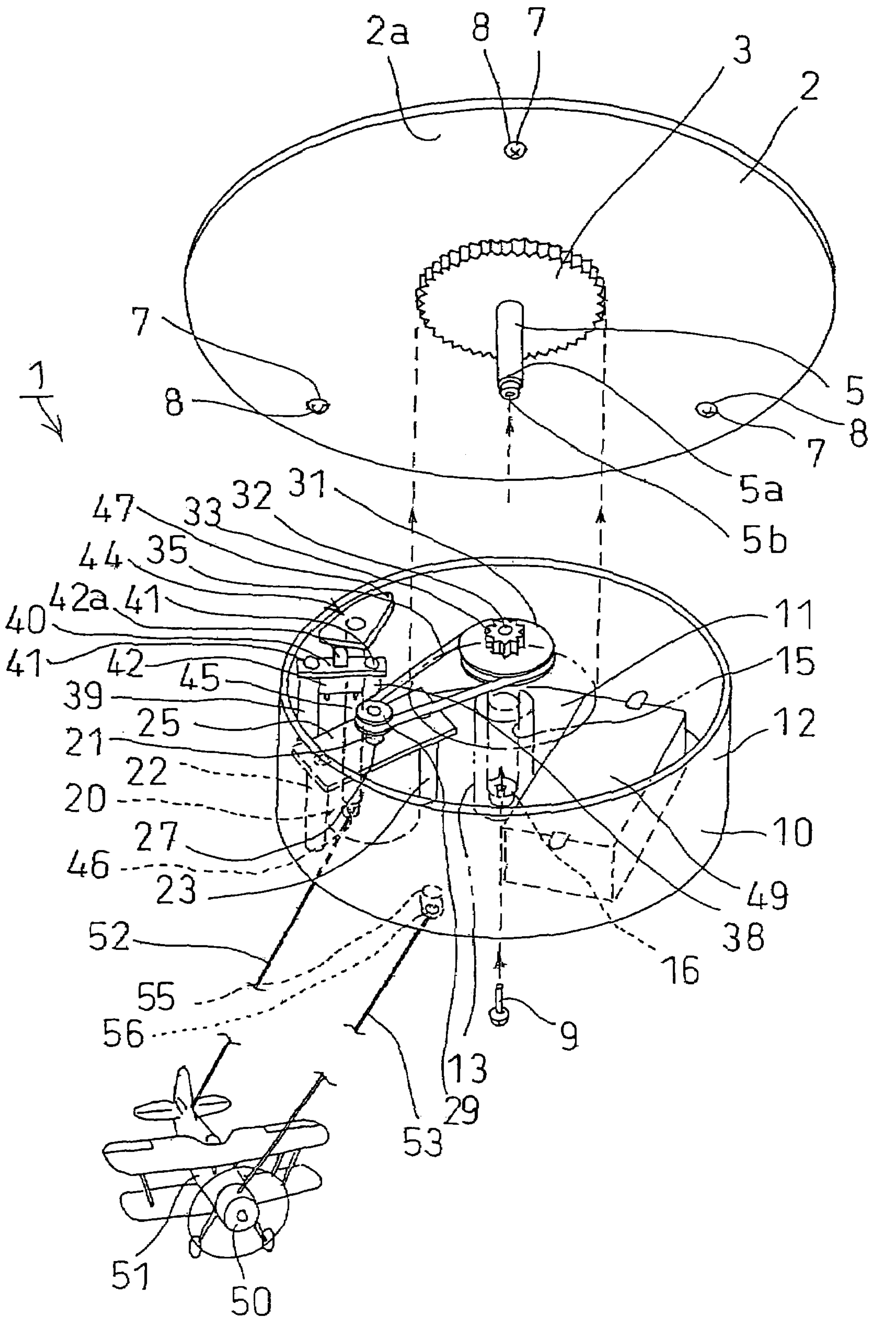
FIG. 1 is a general exploded perspective view showing a turning device according an embodiment of the present invention.
Figure 2:
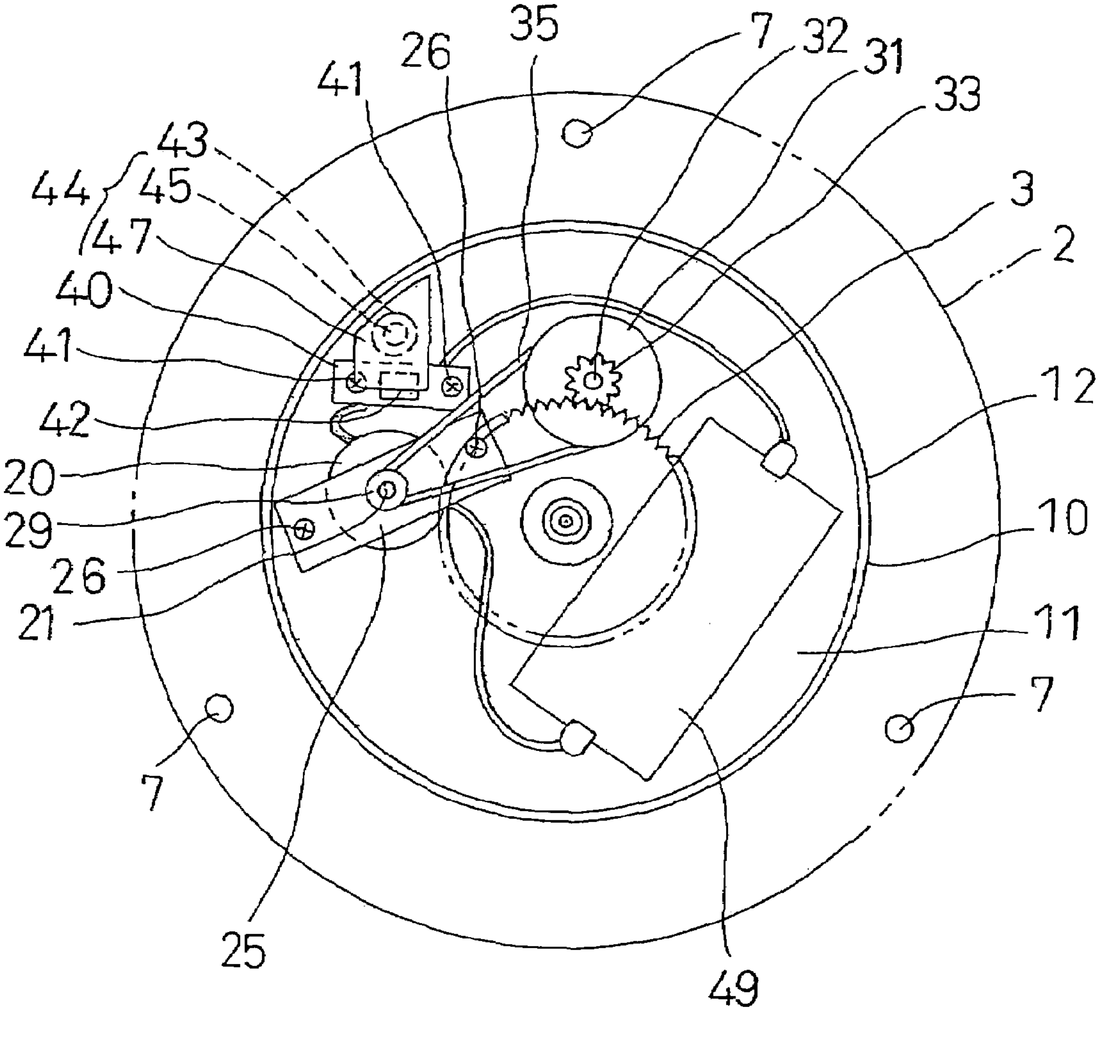
FIG. 2 is a plan view of the turning device with its base plate removed.
Figure 3:
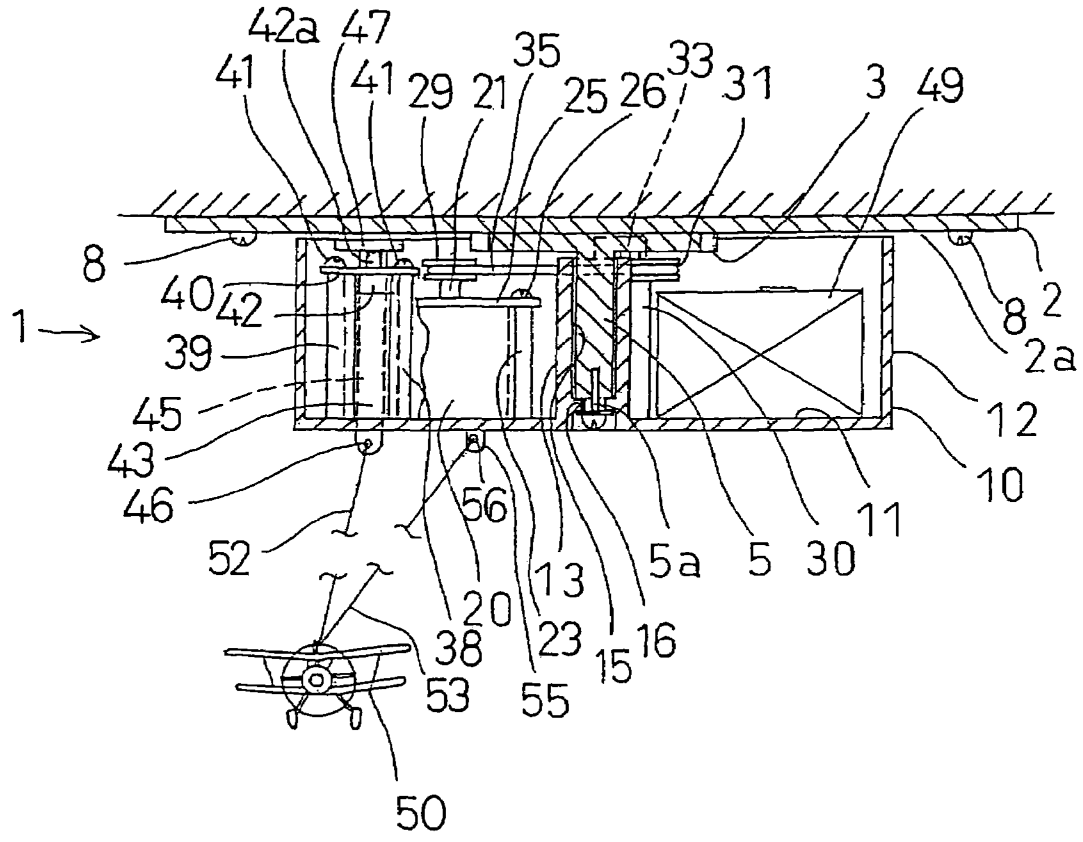
FIG. 3 is a side sectional view of the turning device.

A turning device 1 includes: a base plate 2, and a rotating case 10 rotatably provided on the base plate 2, in which: a sun gear 3 is secured to the base plate 2; the rotating case 10 is provided with a planetary gear 33 in mesh with the sun gear 3 secured to the base plate 2, a drive motor 20 for rotating the planetary gear 33, a power source portion 49 for supplying electricity to the drive motor 20, a switch 42 for controlling the driving/stopping of the drive motor 20, an operating means 44 for operating the switch 42, and suspending members 52 and 53 for suspending a turning body 50; and the suspending member 52 is connected to the operating means 44.

The turning device 1 will be described in detail. The base plate 2 is formed as a disc of synthetic resin, and has substantially at the center of its lower surface **2*a* the sun gear 3 fixed by adhesive, a screw or the like. Substantially at the center of the sun gear 3, a center shaft 5 is formed integrally. The center shaft 5 has a step portion 5*a* in its lower portion and a screw hole 5*b* at its lower end. Three screw passing holes 7 are formed at equal intervals in the periphery of the base plate 2**.

The rotating case 10 is formed of synthetic resin, and is composed of a round bottom wall 11 and a peripheral wall 12 provided around the bottom wall 11. Substantially at the center of the bottom wall 11, there protrudes a cylindrical bearing boss 13. The bearing boss 13 has a bearing hole 15 rotatably supporting the center shaft 5 of the base plate 2 and an engagement edge 16 to be engaged with the step portion **5*a* of the center shaft 5**.

On the bottom wall 11 of the rotating case 10, there is provided the drive motor 20 such that the axis of its drive shaft 21 is vertically directed. On either side of the drive motor 20, there are provided support shafts 22 and 23. To the upper ends of the support shafts 22 and 23, a bearing plate 25 is mounted by means of screws 26. This bearing plate 25 has a bearing hole 27 for rotatably supporting the drive shaft 21 of the drive motor 20. A small pulley 29 is mounted to the drive shaft 21 protruding from the bearing hole 27 of the bearing plate 25.

A bearing boss 30 protrudes from the bottom wall 11 of the rotating case 10, and a rotation shaft 32 to which a large pulley 31 is secured is rotatably mounted to the bearing boss 30. To the upper portion of the rotation shaft 32 protruding form the large pulley 31, a planetary gear 33 is secured. A rubber belt 35 such as a rubber band is wrapped around the large pulley 31 and the small pulley 29. The planetary gear 33 is in mesh with the sun gear 3.

A pair of support columns 38 and 39 are secured to the bottom wall 11 of the rotating case 10, and a mounting plate 40 is mounted to the upper ends of the pair of support columns 38 and 39 by means of screws 41. A push type switch 42 is provided on the mounting plate 40. The switch 42 is provided with a push button portion **42*a*** urged by an elastic member (not shown).

Further, on the bottom wall 11 of the rotating case 10 and in the vicinity of the pair of columns 38 and 39, there is provided a guide cylinder 43. In this guide cylinder 43, a slide shaft 45 is slidably provided. On top of the slide shaft 45, there is provided an abutting plate 47 abutting the push button portion 42*a* of the switch 42. The lower portion of the slide shaft 45 protrudes from the bottom wall 11, and this protruding lower portion has a mounting hole 46. The slide shaft 45 and the abutting plate 47 constitute an operating means 44. On the bottom wall 11 of the rotating case 10, there is provided a battery box 49 accommodating a battery. The battery in the battery box 49 and the switch 42 are electrically connected to each other to form an electric circuit.

Reference numeral 50 indicates a turning body in the form of an airplane, the front and rear portions of its body 51 are connected to the lower ends of the string-like suspending members 52 and 53, whereby the turning body is suspended by the suspending members 52 and 53. The upper portion of the suspending member 52 connected to the rear portion of the body 51 is inserted into the mounting hole 46 of the slide shaft 45 and connected thereto. The upper portion of the suspending member 53 connected to the front portion of the body 51 is inserted into a mounting hole 56 of a connection member 55 secured to the lower surface of the bottom wall 11 of the rotating case 10 and is connected thereto. The turning body is not restricted to be in the form of an airplane; it may also be in the form of a doll. The weight of the turning body 50 pulls down the slide shaft 45 through the suspending member 52, and the abutting plate 47 tries to depress the push button portion 42*a* of the switch 42. However, the elastic force of an elastic member (not shown) in the switch 42 is stronger than this push-down force, so that the push button portion 42*a* is not depressed by the weight of the turning body 50.

In the turning device 1 constructed as described above, when the center shaft 5 of the base plate 2 is inserted into the bearing hole 15 of the bearing boss 13 of the rotating case 10, the planetary gear 33 of the rotating case 10 is engaged with the sun gear 3 of the base plate 2, and the step portion 5*a* of the center shaft 5 is engaged with the engagement edge 16 of the bearing boss 13; by threadedly engaging a screw 9 with the screw hole 5*b* formed in the lower end portion of the center shaft 5, the rotating case 10 is rotatably mounted to the base plate 2. The base plate 2 is secured to a predetermined place such as a ceiling by screws 8, adhesive, adhesive tape or the like. When using the screws 8, the screws 8 are passed through the screw passing holes 7 formed in the base plate 2, and then threadedly engaged with the predetermined place such as a ceiling, thereby securing the base plate 2 to the ceiling or the like.

When the turning device 1 is mounted to the ceiling, the turning body 50 is suspended by the suspending members 52 and 53. When the suspending member 52 is pulled downwards, the slide shaft 45 moves downwards, and the abutting plate 47 provided on top of the slide shaft 45 depresses the push button portion 42*a* of the switch 42 to thereby turn on the switch 42. When the downward pulling of the suspending member 52 is released, the push button portion 42*a* is restored to its original position by the elastic force of the elastic member in the switch 42. When the switch 42 is turned on, the drive motor 20 is driven, and the drive shaft 21 rotates, causing the small pulley 29 provided on the drive shaft 21 to rotate. The rotation of the small pulley 29 is transmitted to the large pulley 31 through the rubber belt 35, causing the large pulley 31 and the planetary gear 33 to rotate.

Since the base plate 2 and the sun gear 3 are secured in position, the planetary gear 33, when rotating, turns around the sun gear 3. Since the planetary gear 33 is mounted to the rotating case 10, the rotating case 10 also rotates around the center shaft 5 of the base plate 2. When the rotating case 10 rotates, the turning body 50 suspended therefrom by the suspending members 52 and 53 starts circling.

In the turning device 1, when the suspending member 52 is pulled downwards during rotation of the turning body 50, the slide shaft 45 moves downwards, and the abutting plate 47 provided at the upper end of the slide shaft 45 depresses the push button portion 42*a* of the switch 42 to turn off the switch 42. When the downward pulling of the suspending member 52 is released, the push button portion 42*a* is restored to its original position by the elastic force of the elastic member inside the switch 42. When the switch 42 is turned off, the driving of the drive motor 20 is stopped, and the rotation of the drive shaft 21, the small pulley 29, the rubber belt 35, the large pulley 31, and the planetary gear 33 are stopped, the rotating case 10 also stopping its rotation. In this way, in the turning device 1, solely by pulling the suspending member 52 for suspending the turning body 50, it is possible to cause the turning body 50 to turn or stop.

In the turning device 1, it is also possible to provide a sound generating member such as a melody IC in the rotating case 10, and to electrically connect this sound generating member to the battery in the battery box 49, the drive motor 20, and the switch 42 to form an electric circuit, causing sound generation simultaneously with the driving of the drive motor 20, that is, the rotation of the rotating case 10. Further, it is also possible to provide a plurality of light emitting elements, such as LEDs, on the peripheral wall 12 of the rotating case 10, and to connect the light emitting elements to the battery in the battery box 49, the drive motor 20, and the switch 42 to form an electric circuit, causing light emission or flash simultaneously with the driving of the drive motor 20, that is, the rotation of the rotating case 10 to thereby highlight characters, pictures, etc.

Furthermore, it is also possible to form the suspending members 52 and 53 of light transmitting members and to provide in the rotating case 10 a light emitting member for transmitting light to the suspending members 52 and 53, connecting this light emitting member electrically to the battery in the battery box 49, the drive motor 20, and the switch 42 to form an electric circuit; the light emitting member is caused to emit light or flash simultaneously with the driving of the drive motor 20, that is, the rotation of the rotating case 10, making it possible for the suspending members 52 and 53 themselves to emit light or flash.

Furthermore, it is also possible to form the suspending members 52 and 53 of flexible synthetic resin pipes; to provide conductive wires in the suspending members 52 and 53; to provide in the turning body 50 suspended by the suspending members 52 and 53 a sound generating member, such as a melody IC, a light emitting element, such as an LED, and a rotary motor for rotating a propeller or the like; and to connect the sound generating member, the light emitting element, and the rotary motor to one of the conductive wires, and the other conductive wire electrically to the battery in the battery box 49, the drive motor 20, and the switch 42 to form an electric circuit to cause sound generation of the sound generating member, light emission or flash of the light emitting element, and rotation of the rotary motor in the turning body 50 simultaneously with the driving of the drive motor 20, that is, the rotation of the rotating case 10. It is also possible to wind electrical cords around the suspending members 52 and 53, connecting the electric components in the turning body 50 to the electric circuit in the rotating case 10 through the electrical cords.

Further, it is also possible to magnetize the screw 9 used to mount the rotating case 10 or attach a magnet to the head of the screw 9, whereby a light object, such as an amulet or a strip of paper, can be suspended by being detachably attached due to the magnetic force of this portion. In this case, unlike the rotating case 10, the screw 9 does not rotate, so that the object suspended by the screw 9, etc. Does not rotate, either; thus, it is possible to cause the turning body 50, which is rotated by the rotating case 10, to turn around the attached object, such as the amulet or the strip of paper, which does not rotate. In such a case, it will be possible, for example, to use the turning device of the present invention as a New Year ornament or the like. In this case, it is possible to attach a strip of paper with words such as "good luck" by magnetic force and to cause the turning body 50 in the form of a model of a dragon to turn around it.

[Description of Symbols]

1 . . . turning device, 2 . . . base plate, 2*a* . . . lower surface, 3 . . . sun gear, 5 . . . center shaft, 5*a* . . . step portion, 5*b* . . . screw hole, 7 . . . screw passing hole, 8 . . . screw, 9 . . . screw, 10 . . . rotating case, 11 . . . bottom wall, 12 . . . peripheral wall, 13 . . . bearing boss, 15 . . . bearing hole, 16 . . . engagement edge, 20 . . . drive motor, 21 . . . drive shaft, 22 . . . support shaft, 23 . . . support shaft, 25 . . . bearing plate, 26 . . . screw, 27 . . . bearing hole, 29 . . . small pulley, 30 . . . bearing boss, 31 . . . large pulley, 32 . . . rotation shaft, 33 . . . planetary gear, 35 . . . rubber belt, 38 . . . column 39 . . . column, 40 . . . mounting plate, 41 . . . Screw, 42 . . . switch, 42*a* . . . pushbutton portion, 43 . . . guide cylinder, 44 . . . operating means, 45 . . . slide shaft 46 . . . mounting hole, 47 . . . abutting plate, 49 . . . battery box (power source portion), 50 . . . turning body, 52 . . . suspending member, 53 . . . suspending member, 55 . . . connection member, 56 . . . mounting hole.

INDUSTRIAL APPLICABILITY

As described above, the present invention provides a turning device that can be utilized as a toy, an ornament or the like.

Also, the turning device as claimed in claim 1, includes: a base plate and a rotating case rotatably provided on the base plate, in which: a sun gear is secured to the base plate; the rotating case is provided with a planetary gear in mesh with the sun gear secured to the base plate, a drive motor for rotating the planetary gear, a power source portion for supplying electricity to the drive motor, a switch for controlling the driving/stopping of the drive motor, an operating means for operating the switch, and a suspending member for suspending a turning body; and the suspending member is connected to the operating means, whereby it is possible to operate the switch for controlling the driving/stopping of the drive motor by the suspending member suspending the turning body, and it is possible to cause the turning body to turn or stop, thus facilitating the operation. Further, there is no need to separately provide a control portion for the drive motor for circling the turning body, and no such bother as mounting of a control portion is involved. Further, the number of components of the control portion is small, which leads to low cost.

Furthermore, in the turning device as claimed in claim 1, the turning body is caused to turn by the rotation of the rotating case while pulling the turning body through the suspending member, so that there is no need to provide in the turning body a power source for circling, whereby it is possible to make the turning body compact and lightweight and to reduce the load on the base plate. Further, since a power source portion is provided in the rotating case for circling the turning body, it is possible to provide in the rotating case a light emitting element and a sound generating member and to effect light-emission/flash and sound generation simultaneously with the rotation of the rotating case by utilizing the power source, whereby it is possible to provide a turning device full of taste. Further, by providing the suspending member with a conductive wire, incorporating electric components such as a sound generating member, a light emitting element, and a rotary motor, into the turning body, and connecting the electric components to the power source portion in the rotating case through the conductive wire, it is possible to drive the electric components of the turning body simultaneously with the circling of the turning body.

The invention claimed is:

1. A turning device comprising: a base plate and a rotating case rotatably provided on the base plate, the turning device being characterized in that: a sun gear is secured to the base plate; the rotating case is provided with a planetary gear in mesh with the sun gear secured to the base plate, a drive motor for rotating the planetary gear, a power source portion for supplying electricity to the drive motor, a switch for controlling the driving/stopping of the drive motor, an operating means for operating the switch, and a suspending member for suspending a turning body; and the suspending member is connected to the operating means.

* * * * *